United States Patent [19]
Kirstein

[11] Patent Number: 5,167,251
[45] Date of Patent: Dec. 1, 1992

[54] THROTTLE IN A HYDRAULIC SYSTEM

[75] Inventor: Lothar Kirstein, Ditzingen, Fed. Rep. of Germany

[73] Assignee: Robert Bosch GmbH, Stuttgart, Fed. Rep. of Germany

[21] Appl. No.: 767,190

[22] Filed: Sep. 30, 1991

[30] Foreign Application Priority Data

Dec. 1, 1990 [DE] Fed. Rep. of Germany ....... 4038437

[51] Int. Cl.$^5$ ...................... F15D 1/02; F16L 55/027
[52] U.S. Cl. ............................... 137/244; 15/104.16; 138/45; 138/46
[58] Field of Search ............... 137/244, 245, 503, 504, 137/540; 251/118, 120, 121, 126, 902; 138/45, 46

[56] References Cited

U.S. PATENT DOCUMENTS

| | | | |
|---|---|---|---|
| 1,079,985 | 12/1913 | Kaminsky | 137/504 |
| 1,296,625 | 3/1919 | Claus | 251/121 |
| 1,808,989 | 6/1931 | Langdon | 137/245 |
| 2,013,860 | 9/1935 | McElwaine | 251/120 |
| 3,400,731 | 9/1968 | McCornack | 137/245 |
| 4,306,585 | 12/1981 | Manos | 137/504 |
| 4,502,510 | 3/1985 | Royle | 138/45 |
| 4,787,411 | 11/1988 | Moldenhauer | 137/244 |

FOREIGN PATENT DOCUMENTS

| | | | |
|---|---|---|---|
| 3923282 | 1/1991 | Fed. Rep. of Germany . | |
| 41891 | 10/1937 | Netherlands | 137/244 |

Primary Examiner—George L. Walton
Attorney, Agent, or Firm—Edwin E. Greigg; Ronald E. Greigg

[57] ABSTRACT

A throttle in a hydraulic system having a cross section which varies as a function of fluid flow in the hydraulic system. A throttle restriction includes a bore with a wire end segment extending in the bore that reduces the cross section of the bore. The wire end segment has an end face, facing counter to the pressure fluid flow, on which flow forces are operative. The flow forces are capable of positively displacing the wire end segment out of the bore counter to a spring restoring force. The throttle can for instance be used in the hydraulic brake systems in which peaks in volumetric flow and pressure are to be reduced. The throttle can also be used wherever self-cleaning of the throttle restriction is desired.

1 Claim, 2 Drawing Sheets

THROTTLE IN A HYDRAULIC SYSTEM

BACKGROUND OF THE INVENTION

The invention is based on a throttle as defined hereinafter.

A throttle in a hydraulic brake system is known (German Patent Application P 39 23 282.4) that has a throttle restriction between a shoulder in a flow conduit for pressure fluid and a cartridge-like component engaging the shoulder by spring action. The throttle restriction is embodied as an opening between the shoulder and the component. The throttle, embodied in a relatively complicated way is intended, in the event that the throttle restriction becomes plugged by foreign bodies such as material rubbed off of seals or the like, to enlarge the throttling cross section counter to spring force, so that the foreign bodies can overcome the throttle restriction. Once the throttle restriction is open again, the component is securely returned to the original position by the spring force.

OBJECT AND SUMMARY OF THE INVENTION

The throttle according to the invention has an advantage over the proposed throttle in that it reacts especially sensitively and rapidly to changes in the flow, because its effective surface is located at a point where high flow speeds occur, which generate a flow force aimed at the effective surface which, when the restoring force is overcome, causes a corresponding opening of the throttle. The throttle is therefore suitable for deflecting peaks in pressure and volumetric flow, and moreover is self-cleaning.

In embodiments of the invention disclosed hereinafter, both the effective surface and a restoring spring are embodied by a single component. The throttle shapes are therefore especially simple, easily manufactured, and easily installed. They are also distinguished by reliable functioning. Foreign bodies find little area on the component to attack and are reliably floated out when the throttle opens.

Where the component is embodied as an end portion of a wire and the throttle restriction is embodied as a bore, the return of the end portion of the wire positively displaced out of the bore to its effective position is promoted by embodying the bore as conically widened in its downstream segment.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
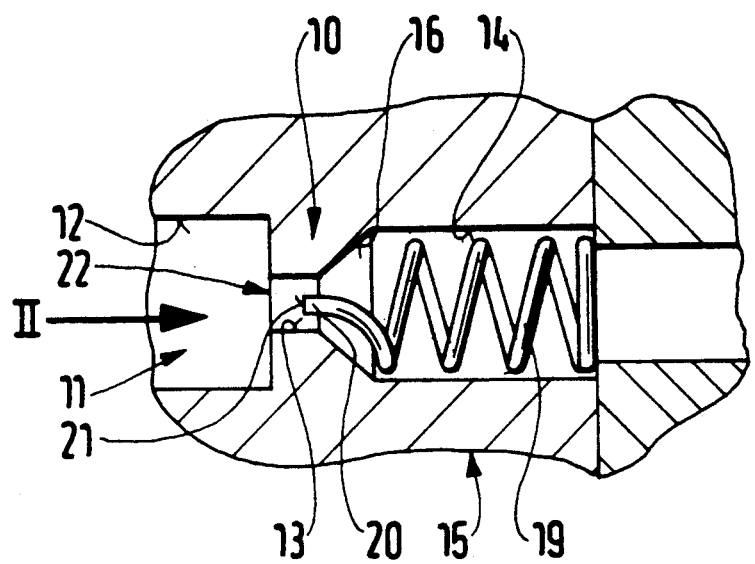
FIG. 1 is a longitudinal section of a first exemplary embodiment of a throttle having a spring disposed downstream, from which spring a wire end segment extends into a bore, as the throttle restriction.
Figure 2:
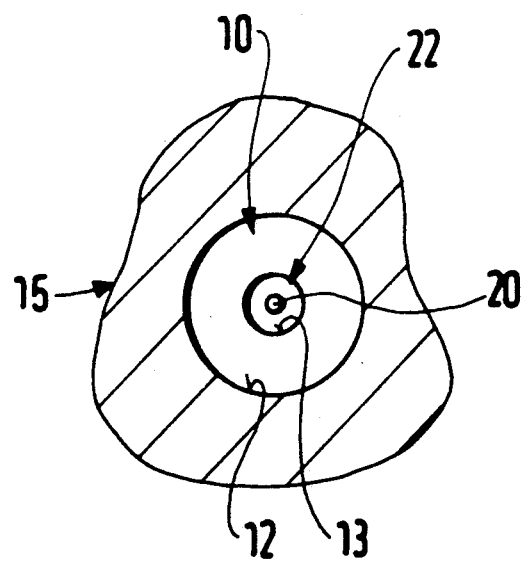
FIG. 2 is a view in the direction of arrow II of FIG. 1 of the bore and wire end segment.

In the first exemplary embodiment shown in FIGS. 1 and 2, a throttle 10 is created in a hydraulic system, such as a motor vehicle brake system, which as its flow conduit 11 has a number of successive aligned, stepped bores 12, 13 and 14 in a hydraulic unit 15. The bore 13 located between bores 12 and 14 has a relatively small diameter; it also has an axial length approximately equal to its diameter. As a transition, there is a conical bore segment 16 having a conical angle of approximately 90° located between the bore 13 and the bore 14. The flow of pressure fluid through the flow conduit 11 is in the direction of the arrow II of FIG. 1.

A helical compression spring 19 is received in the bore 14, in other words downstream of the bore 13. The spring 19 is supported on the hydraulic unit 15 by its downstream end. Upstream, it has an elongated wire end segment 20 extending in the longitudinal direction of the bore. This segment is cut off flat on its face end and therefore has an end face 21, extending transversely to the longitudinal axis of the flow conduit 11, that serves as an effective surface facing counter to the direction of pressure fluid flow. The wire end segment 20 engages the inside of the bore 13 and therefore reduces its free cross-sectional area. This cross-sectional area of the bore 13 reduced by the cross section of the wire end segment 20 forms a passage for the pressure fluid that acts as a throttle restriction 22 of the throttle 10.

The pressure fluid flowing through the bore 13 acts upon the end face 21 of the wire end segment 20, where it builds up a flow force that counteracts the spring restoring force and causes spring deflection of the spring 19. As a result, the wire end segment 20 is shifted toward the bore 14 as a function of the flow. If the flow force is sufficiently great, the end face 21 reaches the region of the conical bore segment 16 and uncovers the entire cross section of the bore 13. The throttle 10 now allows a larger volumetric flow of pressure fluid to flow than when the wire end segment 20 were located in the bore 13. The throttle 10 that increases its flow cross section therefore makes it possible to deflect volumetric flow peaks that otherwise could cause an impermissibly great pressure increase in the upstream part of the hydraulic system. Moreover, dirt particles, such as material rubbed from seals or the like, that accumulate on the end face 21 of the wire end segment 20 or stick between it and the wall of the bore, are floated out when the throttle 10 opens. Once the flow force is reduced, the restoring force generated by the spring 19 causes the return of the wire end segment 20 back into the bore 13. The conical bore segment 16 optionally has a centering effect on the wire end segment 20.

Figure 3:
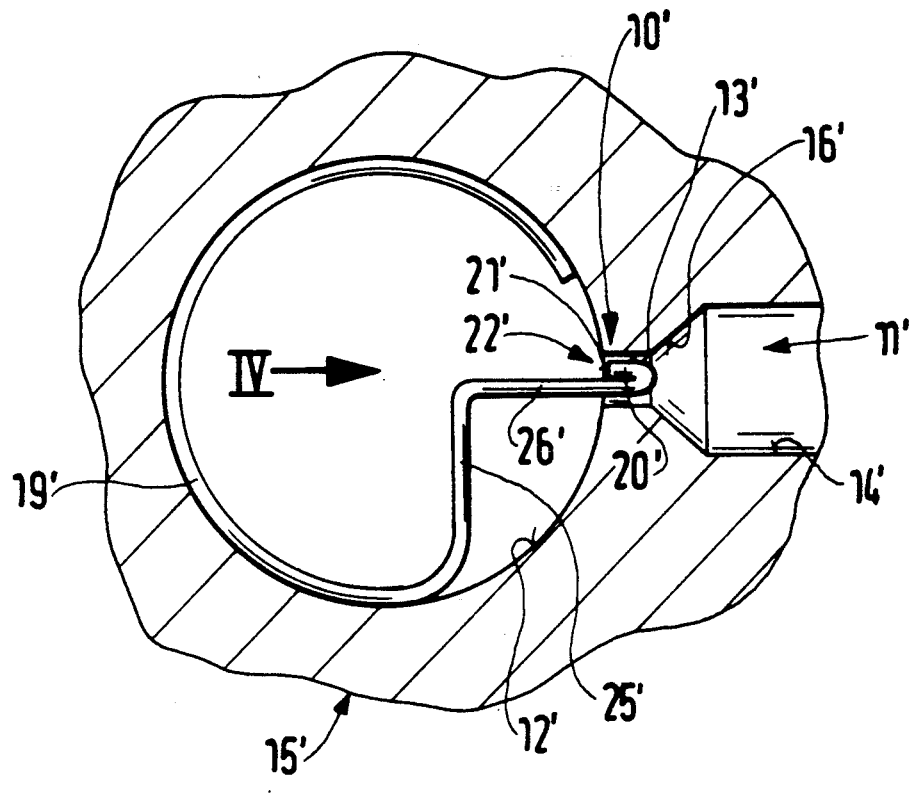
FIG. 3 is a section of a second exemplary embodiment of a throttle having a spring disposed upstream, from which once again a wire end segment extends into a bore as the throttle restriction.
Figure 4:
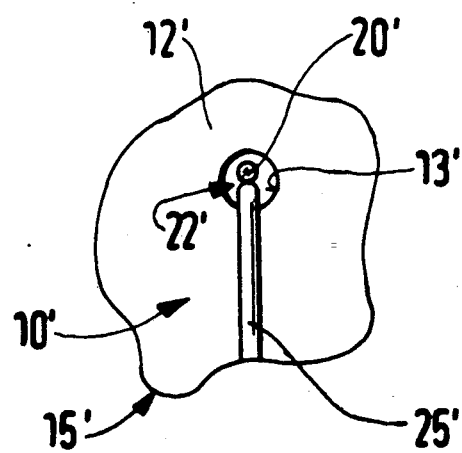
FIG. 4 is a view of the bore and wire end segment in the direction of the arrow IV of FIG. 3.

In the second exemplary embodiment, shown in FIGS. 3 and 4, the flow conduit 11' has a transverse bore 12' of relatively large diameter, at which, extending centrally, the aligned bores 13' and 14' and the conical bore segment 16' begin. Pressure fluid likewise flows through the flow conduit 11' in the direction of the arrow IV in FIG. 3. A spring 19' which is virtually annular in embodiment and extends circumferentially along the wall of the transverse bore, is located in the transverse bore 12'. The spring 19' has a first segment 25', with which it is spaced apart from the wall 12'. Adjoining the segment 25' of the spring 19' is a second segment 26', bent at an angle of approximately 90°, which extends approximately parallel to the downstream longitudinal axis of the flow conduit 11' and reaches through the bore 13'. On its end, the segment 26' of the spring 19' is bent in a U-shape, so that a wire end segment 20' formed in this way, resting on the segment 26', extends in the longitudinal direction of the bore. The wire end segment 20' again has a blunt end, and therefore has an end face 21' located in the bore 13', as an effective surface for the pressure fluid.

Unlike the first exemplary embodiment, in this embodiment of the throttle 10', the opening of the bore 13' acting as a throttle restriction 22' is reduced in cross section by the two cross-sectional areas of the spring segment 26' and the wire end segment 20'. However, the operation of this embodiment of the throttle 10' is the same: flow forces acting on the end faces 21' cause a deflection of the spring 19' in such a way that the wire end segment 20' is shifted downstream. When the end face 21' emerges from the bore 13', the throttle 10' opens, so that peaks in volumetric flow are deflected and dirt is floated out. The restoring force generated by the spring 19' causes a return of the wire end segment 20' into the bore 13'.

In both exemplary embodiments, the springs 19 and 19' are shown with a circular wire cross section. Square or rectangular wire cross sections or other spring shapes may, however, also be used.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A throttle in a flow conduit of a hydraulic system, including a small diameter bore (13) and a large diameter bore (14) separated by a conical bore (16), said small diameter bore forming a throttle restriction the cross section of which can be enlarged as a function of hydraulic flow, a coil spring (19) disposed within said flow conduit, one end of said coil spring is seated on a shoulder at one end of said conduit, another end of said coil spring extends only partway into said small diameter bore, said another end of said coil spring forms a wire end segment (20, 20') having an effective end surface (21, 21') in the small diameter bore (13, 13') facing counter to a hydraulic flow of pressure fluid which under a sufficient force of fluid pressure on the end surface (21, 21') positively forces the wire end segment (20, 20') out of the bore (13, 13') into an area bounded by the conically widened bore in order to increase the flow cross section of the small diameter bore and to permit an increase in fluid flow through said small diameter bore, the wire end segment of said coil spring is subsequently returned into the small diameter bore (13, 13') under the influence of the restoring force of said coil spring to restrict fluid flow through said small diameter bore whereby movement of said wire and segment relative to said small diameter bore keeps the small diameter bore free of any debris.

* * * * *